3,478,580
METHOD AND APPARATUS FOR TESTING A GAS TURBINE FUEL MANIFOLD AND NOZZLE ASSEMBLY
John S. Siemietkowski, Cherry Hill, N.J., and Walter D. Antkiewicz, Claymont, Del., assignors to the United States of America as represented by the Secretary of the Navy
Filed Oct. 30, 1967, Ser. No. 678,780
Int. Cl. G01m 15/00
U.S. Cl. 73—119                                6 Claims

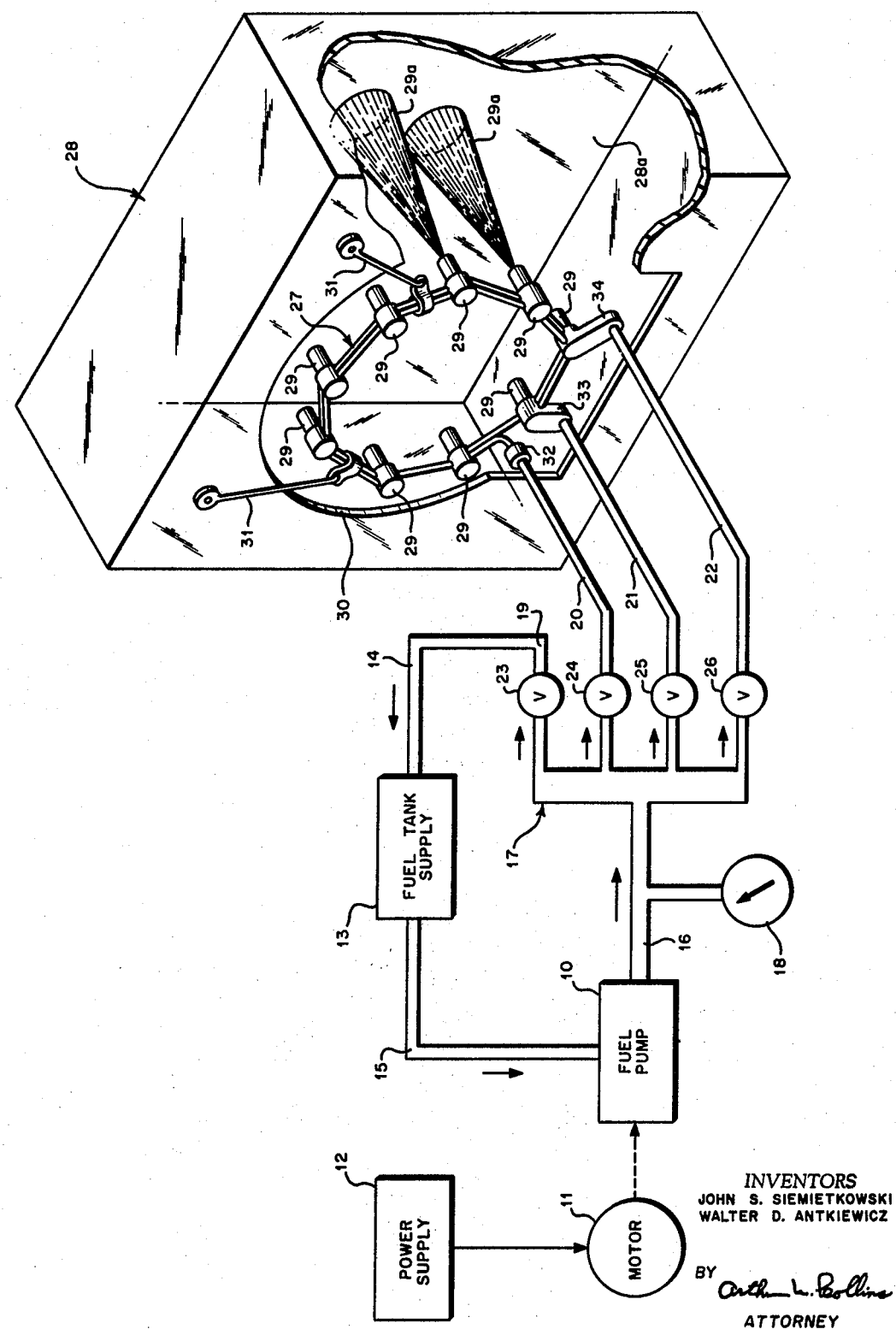

ABSTRACT OF THE DISCLOSURE

The subject invention concerns a method and apparatus for testing fuel manifold and nozzle assemblies found in gas turbine engines. Fuel is circulated to the primary and secondary nozzle connections of the manifold assembly through the discharge conduits of a fuel line network which also controls the pressure of the fuel flow. The manifold and nozzle assembly is installed in a spray box while various tests are conducted at pressures simulating engine operation to insure proper spray angle and flow.

---

The invention described herein may be manufactured and used by or for the Government of the United States of America for governmental purposes without the payment of any royalties thereon or therefor.

The present invention relates particularly to a new and improved testing system for checking the operation of the fuel manifold and nozzle assemblies used in gas turbine marine propulsion engines.

In the past, there was no way an operator could positively check the operation of fuel manifold and nozzle assemblies used in gas turbine marine propulsion engines for proper spray angle and flow. The operating personnel had to remove the fuel manifold and nozzle assembly and ship it to the manufacturer for testing at their private facilities. Complicated stationary equipment was used which required a great deal of expense and time. Also, the tests were conducted, for the most, into the atmosphere with both the primary and secondary nozzles operating simultaneously, which could produce some inaccuracies in the observation and evaluation of the test.

It is therefore a principal object of the present invention to provide a novel and improved method and apparatus whereby the operation of a gas turbine fuel manifold and nozzle assembly may be tested in a very short period of time at the turbine location by operating personnel.

It is a further object of the present invention to provide a novel and improved gas turbine fuel manifold and nozzle assembly testing device which is relatively simple in construction and yet highly accurate and reliable in use.

It is another object of the present invention to provide a manifold testing device which is portable and easily transported between testing operations.

Other objects and many of the attendant advantages of this invention will be readily appreciated as the same becomes better understood by reference to the following detailed description when considered in connection with the accompanying drawing, wherein the single figure is generally a diagrammatic representation of a preferred embodiment of the invention.

Referring now to the details of the single figure of the drawing, the fuel is circulated in the test apparatus by means of a fuel pump 10 which is driven by the shaft of a suitable electric motor 11. The motor 11 is energized by a power supply 12, which may be a standard 60 cycle A.C. source or a portable power supply housing sufficient energy to run the motor 11.

Fuel is supplied to the system by a fuel tank supply 13 which has a drain line 14 and a discharge line 15 connected to the fuel pump 10 so as to introduce the fuel thereto. The pressure side of the fuel pump 10 is connected to a fuel inlet conduit 16 of a fuel line network 17 whose function will become more apparent hereinafter. A pressure gage 18 or any other suitable conventional pressure measuring device is connected in the fuel inlet conduit 16 to determine the pressure of the fuel circulating through the fuel line network 17.

The fuel line network 17 has four fuel discharge conduits 19–22 respectively. The fuel discharge conduit 19 performs as a bleed line for the system and is connected to the drain line 14 of the fuel tank supply 13. Control valves 23–26 are connected in each of the fuel discharge conduits 19–22 respectively, and may be standard high pressure needle valves, for example, or any other suitable conventional means to control the rate of fuel flow in the system while testing is being conducted. By regulating the control valve 23, the pressure of the fuel which circulates through the fuel manifold and nozzle assembly may be adjusted to simulate actual engine operation, in a manner in which will become more apparent hereinafter.

The fuel manifold and nozzle assembly 27 to be tested is installed in a generally rectangular shaped test enclosure or spray box 28. The assembly 27 is shown having nine discharge nozzles 29 equally spaced around its circumference, but is not limited thereto and may have more or less depending on the particular turbine engine for which it is to be employed. The assembly 27 is positioned for testing in a cutout portion 30 of the front wall of the spray box 28 so that the nozzle spray is directed toward the interior and the back wall 28a of the spray box. The assembly 27 is fixedly held in place by the brackets 31 which are attached to the assembly 27 and a portion of the front wall of the spray box which has not been cut out. The spray box 28 is preferably constructed of a clear plastic material or any other suitable transparent substance so that the spray pattern of the nozzles may be easily observed by the test operator on the back wall 28a of the spray box, as shown in the drawing at 29a.

The fuel discharge conduits 20–22 of the fuel line network 17 are connected to the primary and secondary nozzle connections of the fuel manifold and nozzle assembly 27. For example, the fuel discharge conduit 20 may be connected to the single primary nozzle connection 32; the conduit 21 may be connected to the connection for the remaining primary nozzles, shown at 33; and the conduit 22 may be connected to the connection for the secondary nozzles, shown at 34. The control valves 24–26 connected in the discharge conduits are opened or closed to control the fuel flow through the manifold and nozzle assembly, depending on the particular test being performed.

In operation, the motor 11 drives the fuel pump 10. By regulating the control valve 23, the control valves 24–26 allow the fuel to circulate to the three nozzle connections 32–34 at fuel pressures simulating engine operation.

Various tests must be conducted on the fuel manifold and nozzle assembly to ensure that a proper flow and spray pattern exists for combustion. Once the assembly to be tested is removed from the gas turbine engine and is connected and installed as shown in the drawing, a preliminary spray check is initiated to determine the general condition of the assembly. The control valve 26, which controls the flow of fuel to the secondary nozzle connection at 34, is closed so that no fuel can flow therethrough. The motor 11 is then started so that the fuel pump 10 begins to circulate fuel through the fuel line network 17 to the assembly 27. By adjusting the control valve 23, the pressure of the system, as monitored by the pressure gage 18, can be regulated so that the spray pattern and cone angle may be observed on the back wall 28a of the spray box 28 at conditions simulating actual engine operation. If one or more nozzles show a streaky pattern or an unacceptable cone angle, all the nozzles are removed from the manifold and cleaned before proceeding with further testing.

If all nozzles show clear, unstreaked spray patterns, and have acceptable cone angles, the nozzles are then tested individually. Nozzle clamps are installed on all of the nozzles except one so that fuel spray is only achieved through the one unclamped nozzle. The unclamped nozzle is the one to be tested. The pressure is adjusted to a predetermined value, depending on the assembly 27 to be tested, by regulating the control valve 23 and the spray pattern and cone angle of the individual nozzle is observed. The pressure is increased at certain predetermined increments and the spray pattern is observed at each step. As with the preliminary spray check, an acceptable nozzle should be free from streaks and distortions.

The control valve 26 is then opened to allow fuel to flow through both the primary and secondary nozzles of the assembly 27. The pressure is adjusted to a predetermined value and varied as previously stated. The flow pattern is observed at each increment of pressure to determine whether the individual unclamped nozzle is operating satisfactorily with both the primary and secondary nozzles receiving fuel.

A hose is then attached to the unclamped nozzle and the free end thereof is placed into a receptacle to receive the flow of fuel. The pressure of the circulating fuel is then adjusted to the value at which the fuel flow is to be tested. The free end of the hose is placed into a calibrated bottle and the fuel is collected for a predetermined time, depending on the type of bottle used, to determine whether a proper flow rate is achieved. The calibrated bottle may be replaced, for example, with a flowmeter which will give a direct and instantaneous indication of the rate of fuel flow. All remaining nozzles are then checked individually for a proper flow and spray pattern by the previously recited method. It is necessary that all the nozzles be flow and spray checked before a correct interpretation can be placed in the individual nozzle readings.

Since it is possible that a fuel nozzle may be in perfect condition, yet give abnormal readings due to the fuel manifold being at fault, a final test must be carried out to check the manifold and nozzle areas thoroughly for any sign of leakage. This is accomplished by installing nozzle clamps on all the nozzles 29 of the assembly 27. The pressure is then adjusted to a predetermined value and the assembly 27 is observed for any signs of fuel leakage which might indicate a manifold crack or improper contact between a nozzle and the manifold.

Obviously many modifications and variations of the present invention are possible in the light of the above teachings. It is therefore to be understood that, within the scope of the appended claims, the invention may be practiced otherwise than as specifically described.

What is claimed is:

1. In apparatus for testing the operation of a gas turbine fuel manifold and nozzle assembly:
   (a) a fuel tank supply having a drain and a discharge line;
   (b) a fuel line network having a fuel inlet conduit and four fuel discharge conduits, one of said fuel discharge conduits being connected to the drain line of the fuel tank supply and said other fuel discharge conduits being connected to the manifold nozzle connections of the fuel manifold and nozzle assembly;
   (c) a fuel pump connected between the fuel tank supply discharge line and the fuel inlet conduit of the fuel line network for circulating the fuel through the apparatus;
   (d) means for measuring fuel pressure connected between the fuel pump and the fuel inlet conduit;
   (e) a control valve connected in each of the four fuel discharge conduits for regulating the fuel pressure and fuel flow through the manifold and nozzle assembly so that testing may be carried out at conditions simulating engine operation;
   (f) and a transparent, substantially rectangular spray box, said fuel manifold and nozzle assembly secured on said spray box so that the nozzle spray caused by the circulating fuel is directed into an interior wall thereof, whereby the spray pattern of the nozzles may be observed during operation through said box.

2. In a method of testing the operation of a gas turbine fuel manifold and nozzle assembly having primary and secondary nozzles, said method comprising the steps of:
   (a) removing the fuel manifold and nozzle assembly from the gas turbine engine;
   (b) connecting the primary and secondary nozzle connections of the fuel manifold and nozzle assembly to the conduits of a fuel line network which circulates fuel from a tank supply to the assembly;
   (c) installing the fuel manifold and nozzle assembly in a spray box;
   (d) closing the conduit connected to the secondary nozzle connection so that no fuel can flow therethrough;
   (e) circulating fuel through the fuel line network to the assembly;
   (f) regulating the pressure at which the fuel is circulated to the assembly till a test pressure is achieved which simulates actual engine operation;
   (g) and observing the spray pattern and cone angle of all the nozzles in the spray box to determine whether the assembly is operating satisfactorily.

3. In a method substantially as described in claim 2, further including the steps of:
   (a) installing nozzle clamps on all of the nozzles except one so that fuel spray is only achieved through the one unclamped nozzle;
   (b) adjusting the pressure at which the fuel is circulated to the assembly until a test pressure is achieved;
   (c) and observing the spray pattern and cone angle of the individual nozzle in the spray box to determine whether the individual nozzle is operating satisfactorily.

4. In a method substantially as described in claim 3, further including the steps of:
   (a) opening the conduit connected to the secondary nozzle connection so that fuel is flowing through both the primary and secondary nozzles;
   (b) adjusting the pressure at which the fuel is circulated to the assembly until a test pressure is achieved;
   (c) and observing the spray pattern and cone angle of the individual nozzle in the spray box to determine whether the individual nozzle is operating satisfactorily with both the primary and secondary nozzles receiving fuel.

5. In a method substantially as described in claim 4, further including the steps of:
   (a) attaching a hose to the unclamped nozzle and placing the free end of the hose into a receptacle;
   (b) adjusting the pressure at which the fuel is circulated to the assembly until a test pressure is achieved;

(c) placing the free end of the hose into a calibrated bottle and collecting the fuel flowing therethrough for a predetermined time;

(d) and observing the amount of fuel collected in the calibrated bottle to determine whether a proper flow rate is achieved.

6. In a method substantially as described in claim 4, further including the steps of:

(a) installing a nozzle clamp on the one unclamped nozzle;

(b) adjusting the pressure at which the fuel is circulated to the assembly until a test pressure is achieved;

(c) and observing the fuel manifold and nozzle assembly thoroughly for any sign of fuel leakage.

References Cited

UNITED STATES PATENTS 2,364,709  12/1944  Greer _____ 73—168
3,221,546  12/1965  Heath.

FOREIGN PATENTS 768,292  2/1957  Great Britain.

RICHARD C. QUEISSER, Primary Examiner

J. W. MYRACLE, Assistant Examiner

U.S. Cl. X.R.

73—432